US008050491B2

(12) United States Patent
Vaidyanathan

(10) Patent No.: US 8,050,491 B2
(45) Date of Patent: Nov. 1, 2011

(54) CAD MODELING SYSTEM AND METHOD

(75) Inventor: Janakiraman Vaidyanathan, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 2354 days.

(21) Appl. No.: 10/738,403

(22) Filed: Dec. 17, 2003

(65) Prior Publication Data
US 2005/0135670 A1 Jun. 23, 2005

(51) Int. Cl.
*G06K 9/00* (2006.01)
(52) U.S. Cl. ........ 382/154; 345/419; 345/664; 345/665; 345/679; 345/680; 348/42
(58) Field of Classification Search .................... 382/154
See application file for complete search history.

(56) References Cited

U.S. PATENT DOCUMENTS

| 4,638,156 | A | * | 1/1987 | Horikawa et al. | 250/235 |
| 5,144,685 | A | * | 9/1992 | Nasar et al. | 382/153 |
| 5,821,943 | A | * | 10/1998 | Shashua | 345/427 |
| 5,995,650 | A | * | 11/1999 | Migdal et al. | 382/154 |
| 2003/0014224 | A1 | | 1/2003 | Guo et al. | |

OTHER PUBLICATIONS

Park et al., "Dual-beam structured-light scanning for 3-D object modeling," May 28-Jun. 1, 2001, IEEE, pp. 65-72.*
Remondino Fabio, "3D Reconstruction of Articulated Objects from Uncalibrated Images," Jan. 2002, SPIE, vol. 4661, pp. 148-154.*
Haala N., Brenner C.; "Laser Data for Virtual Landscape Generation", Nov. 9, 1999, XP002360165.
Tangelder J.W.H., Ermes P., Vosselman G., Van Den Heuvel F.A.; "CAD-Based Photogrammetry for Reverse Engineering of Industrial Installations", vol. 18, Jul. 1, 2003, pp. 264-274, XP002360166.
European Search Report dated Dec. 20, 2005.

* cited by examiner

*Primary Examiner* — Samir Ahmed
*Assistant Examiner* — John Lee
(74) *Attorney, Agent, or Firm* — Carlson, Gaskey & Olds, P.C.

(57) ABSTRACT

A 3D object modeling system and method system and method captures a 2D representation of the object to be modeled and breaks the 2D image into its geometric elements. The 3D stereoscopic image is then fitted to the geometric elements generated from the 2D image to generate the final model. The 3D stereoscopic image may be compared with the geometric elements to detect distortions in the object, allowing the distortions to be corrected in the final model to ensure that the model accurately depicts the original object.

16 Claims, 2 Drawing Sheets

CAD MODELING SYSTEM AND METHOD

TECHNICAL FIELD

The present invention relates to computer assisted design (CAD) system and methods, and more particularly to CAD systems and methods that create a CAD model of an existing object.

BACKGROUND OF THE INVENTION

Designing replacement parts, such as aircraft engine and helicopter airframe sheet metal parts, require accurate three-dimensional (3D) CAD models to provide an accurate tool path for machining the replacement parts. Ideally, the 3D CAD model precisely defines all the geometric elements in a given part, their dimensions and the connectivity relationships between them.

One known 3D CAD modeling technique involves measuring an existing master part and creating a CAD model manually from the measured dimensions. This manual process tends to be very time-consuming and error prone. Further, if the master part is distorted and/or has additional features like holes, slots, etc. on distorted surfaces, the manual process will introduce these errors into the model, making replacement parts produced from the model inaccurate and difficult to assemble onto existing parts.

Another known modeling technique creates a 3D CAD model by scanning the original paper drawings, which are two-dimensional (2D) projections. This is also a time-consuming, error-prone process because the drawings may not be accurate or complete and do not reveal connectivity relationships between features, making automation of the modeling process difficult. In cases where the original part has been modified onsite to solve an assembly problem, these modifications are often not reflected in the master drawing, making replacement parts made from the drawing unfit for proper assembly.

Yet another technique uses a scanning system normally used to reproduce complex surfaces like airfoil shapes. Scanning systems are particularly appropriate for sculpted, parametric surfaces. However, sheet metal parts are not sculpted surfaces, but are a combination of regular geometric surfaces (e.g., planes and cylinders) and are therefore less complex. Scanning systems employed in airfoil scanning will reproduce the geometries faithfully, including any distortions in the part. This results in a sculpted surface and not a regular geometric surface. Thus, the tool path produced using this method will be useful for machining sculpted surfaces and not for regular geometric surfaces because the tool path created is more complex and, paradoxically, more error-prone due to the distortions in the resulting model.

For example, a planar surface with even slight imperfections (e.g., a dented sheet metal plane) will result in a multi-faceted parametric surface because even minor imperfections on the surface being scanned are assumed to be part of the sculpted surface and therefore faithfully reproduced by a sculpted point cloud model. Thus, the scanning system requires a complex multi-axis machine to reproduce even simple surfaces. Deriving a simpler CAD model out of this to reproduce the standard geometric surfaces adds further complexity to the modeling process.

There is a desire for 3D CAD modeling system and method that can generate an accurate 3D model that is an exact replica of an original part while optimizing processing resources and time.

SUMMARY OF THE INVENTION

The present invention is directed to a system and method for generating a 3D model of an object. The system includes cameras, a 3D scanner, and at least one image processor that processes both 2D and 3D images. The cameras first capture a 2D image of the object to be modeled and breaks the 2D image into its constituent geometric elements. The 3D scanner then scans the object and generates a 3D stereoscopic image depicting the object. The scanner may adjust its scanning process based on the feature-richness of the object, such as reducing the scanning speed if the object contains many geometric elements and features and increasing the scanning speed if the object is made of only a few simple geometric elements. The 3D stereoscopic image is fitted to the geometric elements generated from the 2D image to generate the final model.

In one embodiment, the 3D stereoscopic image is compared with the possible geometric elements in the 2D image to detect distortions in the object. These distortions may then be automatically removed to ensure that the generated model does not duplicate the distortions but faithfully reflects the original design intent. Thus, the invention can generate a model that is a more accurate reproduction even compared to the original physical object from which the model is generated.

DETAILED DESCRIPTION OF THE EMBODIMENTS

The invention is generally directed to a 3D modeling method and system that automatically creates a full 3D CAD model of regular featured geometry sheet metal items quickly and automatically. Unlike scanning systems for complex airfoil shapes, which interprets each point and creates a sculpted surface, this process automatically creates full CAD models that are the exact replica of the original regular geometry. This process also automatically corrects and compensates for distortions in the scanned surfaces, placing any holes and other localized features in the correct location in an undistorted surface in the generated model.

Figure 1:
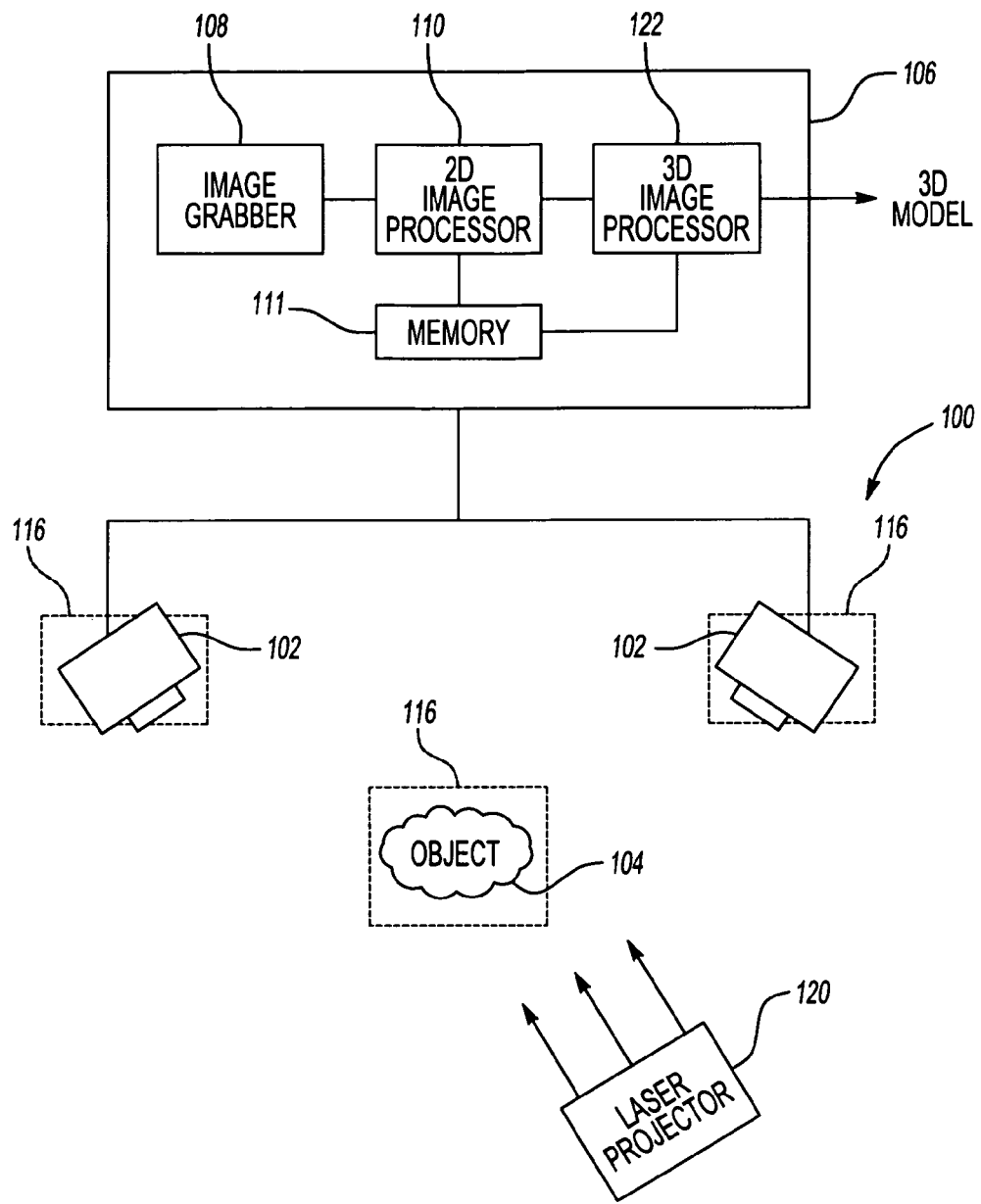
FIG. 1 is a representative block diagram illustrating a system according to one embodiment of the invention.

FIG. 1 is a representative block diagram illustrating components of a modeling system 100 according to one embodiment of the invention. In one embodiment, the system 100 a 2D gray-tone vision system was integrated with a 3D scanning system. Generally, the system 100 avoids the extensive processing resources needed in currently-known modeling systems by creating a full 3D CAD model of an object by interpreting the object's shape as a combination of regular geometric surfaces rather than as a complex sculpted surface. To do this, the system first generates a two-dimensional (2D) grey-tone geometric map of the object. The 3D scanning system then scans the object and fits the scanned 3D points to the geometries noted in the 2D map. By fitting the 3D scanned data into the 2D geometric map, the inventive system and method can create a model for just the elements present, which is less time-consuming and a generates a more accurate reproduction compared to conventional methods while at the same time being able to automatically correct for any inaccuracies (e.g., distortions, warping, etc.) inherent in the objects.

The modeling system 100 itself may include one or more cameras 102, such as black and white CCD cameras, used to capture a profile of a object 104 to be modeled. The cameras 102 may be black-and-white cameras 102 and have a desired pixel resolution. The cameras 102 communicate with a computer 106, which can be any device that can process data. The cameras 102 send image data to an image grabber 108 in the computer 106, which captures the image taken from the cameras 102 and stores it as a 2D gray-tone image. An image processor 110 breaks the 2D gray-tone image from the image grabber 108 into its component geometric objects. In one embodiment, a memory 111 stores a geometric element standards library from which the image processor 110 can choose the geometric elements to match the 2D gray-tone image. In this, the standard image library includes planes (e.g., for part surfaces), cylinders, arcs (e.g., for surface blending radii), cylinders (e.g., for bolt holes), lines (e.g., for part edges), along with other shapes that reflect all possible geometric elements that will be present in the object 104.

The system 100 also includes a 3D scanning system that scans the object and generates a 3D stereoscopic image (e.g., a point cloud). In one embodiment, the 3D scanner includes a laser projector 120 that projects a plurality of fine laser stripes onto the object 104. The cameras 102 then capture the images of the object 104 illuminated by the projected stripes and send this information to a second image processor 122, which generates a 3D stereoscopic image. Note that although this example has a first image processor 110 to process 2D gray-tone images and a second image processor 122 to process 3D stereoscopic images, the functions of these two processors 110, 122 may be carried out in a single image processor without departing from the scope of the invention.

Either the cameras 102 or the object 104 may be mounted on a movable platform 116 operatively coupled to the computer 106 so that they can be moved in a controlled manner. The image processor 110 takes the 2D gray-tone image information from the camera 102 and the 3D stereoscopic image and fits the points in the 3D stereoscopic image with the geometric elements obtained from the 2D gray-tone image to generate the final model in a manner that will be described in greater detail below.

Figure 2:
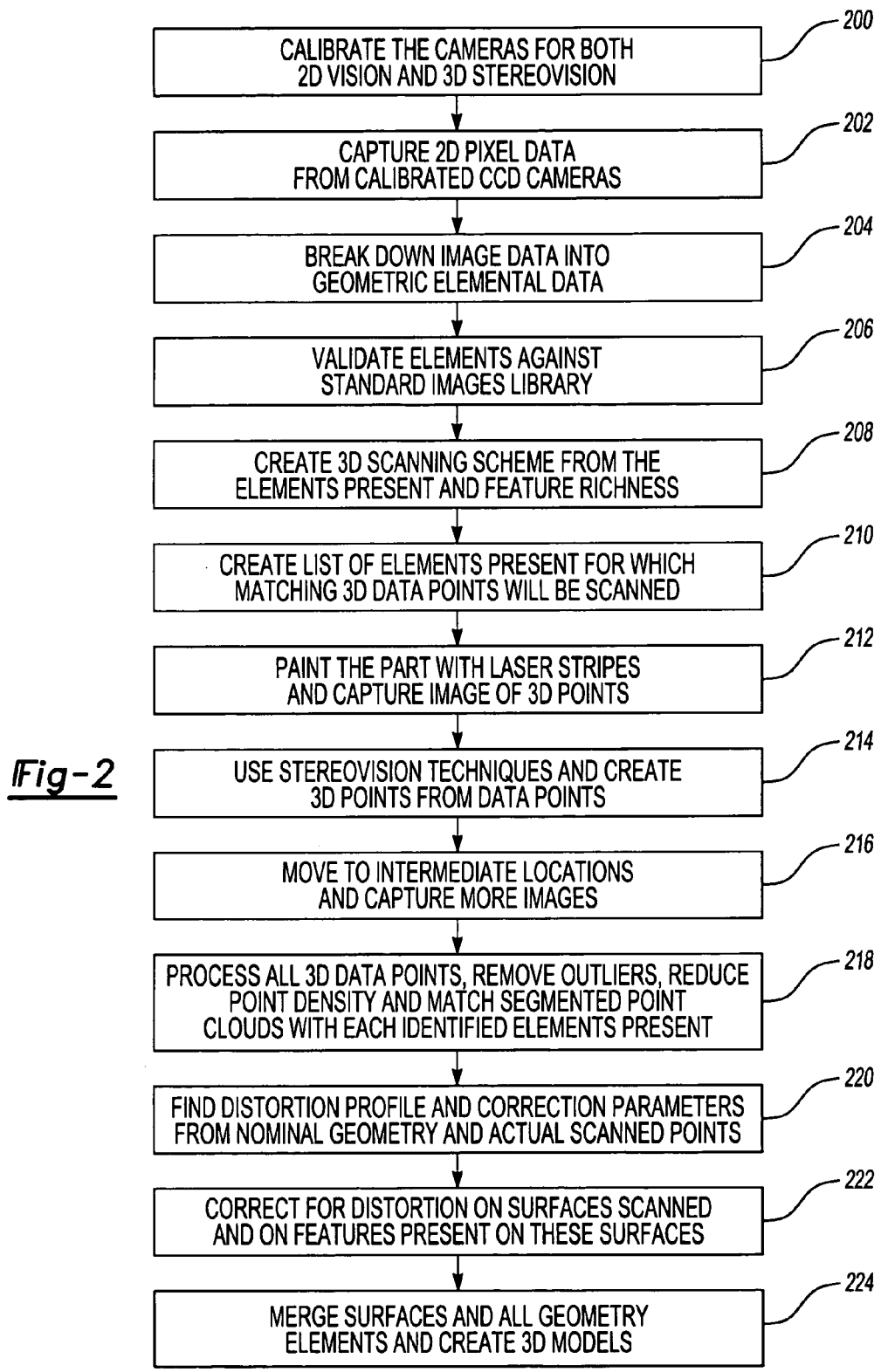
FIG. 2 is a flow diagram illustrating a method according to one embodiment of the invention.

FIG. 2 is a flow diagram illustrating a method carried out by the system shown in FIG. 1 according to one embodiment of the invention. In the first part of the method, the cameras 102 generate the 2D gray-tone image of the object to be modeled. Generally, from this and the library of possible surfaces the 2D system determines all the regular, geometric featured surfaces present and generates a rough geometry information and relationships present between the surfaces.

As shown in FIG. 2, the process may include a calibration step that calibrates the cameras 102 for both 2D vision and 3D stereovision (block 200). In one embodiment, the calibration process includes calibrating each camera 102 for perspective transformation and calculating scaling factors, radial lens distortion, and transformation from the camera coordinate system to the part coordinate system. Camera calibration may be conducted using a known calibration target comprising, for example, a backlit glass plate containing a grid of precise squares. In one embodiment, a 3D-to-2D mapping transformation is generated using the grid corner coordinates by matching the corresponding measured camera coordinates for each corner of each square on the grid. A stereovision algorithm then uses this transformation to combine the camera coordinates for each pixel on each image to generate the 3D coordinate corresponding to that pixel.

After calibration, the cameras 102 and image grabber 108 capture 2D pixel data, forming a 2D gray-tone image representation of the object 104 (block 202). The image processor 110 then breaks down the 2D gray-tone image into its geometric elements (block 204) and validates the geometric images against geometries in the standard image library (block 206). The geometric element breakdown and validation step fits the geometric elements present in the 2D gray-tone image against standard geometries in the library, resulting in the 2D geometry model. In one embodiment, the edge detection is conducted by noting the rate of change in light intensity levels at object boundaries and indicating a geometric boundary at a given location if the rate of change at that location is above a threshold value. A special filtering algorithm may be used to identify the boundaries between geometric elements in the 2D image. When the reflected light intensity falls off rapidly it marks an edge boundary; the 2D gray tone images are run through software filters to increase the contrast and to make the boundary demarcation easy and automatic. Uniform illumination of the object 104 during image capture ensures accurate detection of these boundaries.

Next, the system 100 uses the 2D geometry model in conjunction with the 3D scanning system to generate the final model. In one embodiment, the system 100 uses the 2D geometry model to create a 3D scanning scheme based on the complexity and type of elements present in the model (block 208). For example, if the 2D geometry model reflects a feature-rich profile (e.g., if the object contains many holes and rapidly changing geometric profiles), the system 100 may modulate the 3D scanning speed so that it is slower to ensure that all of the features are captured. On the other hand, if the object surface is, for example, a simple plane with no additional features, the system 100 increases the speed of the scanning process.

Once the scanning scheme has been created (block 208), the image processor 110 creates a list of geometric elements present in the 2D geometry model so that it can later fit points obtained via the 3D scanning process to match the geometries (block 210). This is much faster than creating all possible geometries that will fit the points from scratch.

Next, the laser projector 120 projects a plurality of stripes onto the object 104 and the cameras 102 capture 3D stereoscopic images of the portions illuminated by the stripes (block 212). The second image processor 122 then calculates the 3D coordinates of the illuminated points using, for example, stereoscopic point-matching techniques (i.e., by matching points on each illuminated stripe on each camera screen to a corresponding point on the object 104) to generate a 3D stereoscopic image (e.g., a point cloud) of the object 104 (block 214).

To add more detail to the 3D stereoscopic image, the cameras 102 and the object 104 may be moved relative to each other in selected increments. The cameras 102 can therefore capture additional images based on the desired amount of detail in the point cloud geometry and/or the detail richness of the original object (block 216). The decision of whether to capture additional images and the scanning speed to be used is based on the 3D scanning scheme obtained in block 208. An object 104 having a large amount of detail, for example, may warrant more images than an object having a simple geometry and little detail. Regardless of the specific scanning scheme, the ultimate scanning speed and number of images is chosen so that the generated model reflects all of the details in the object 104 while optimizing time and processing resources. In one embodiment, the cameras 102 and/or the object may be moved so that they capture images of the object 104 at intermediate locations between previous stripe positions. A composite 3D stereoscopic image of the object 104 may then be obtained by stitching together the various images from each intermediate location of the captured 3D images, and this will have a point density commensurate with the detail richness of the original object.

Once all of the desired 3D stereoscopic images have been obtained, the second image processor 122 matches segments of the point clouds obtained via the 3D scanning process with the geometric elements obtained in the 2D imaging process (block 218). Note that this geometric element matching step does not require fitting parametric surfaces that accommodates all the points in the point cloud; instead, the image processor 122 merely fits the 3D stereoscopic images to the identified geometric elements via a reverse geometry creation system, which is a simpler process. The geometric elements provide guidance on how to segment the point clouds to fit them to the elements, forming an initial 3D model that matches the 3D stereoscopic images to the detected geometric shapes and the connectivity relationships between the shapes.

The constraints offered by the geometric elements causes the image processor 122 to automatically conduct stray point noise reduction, point density reduction, feature matching and feature sharpening in the 3D image of the object because the processor 112 will generally disregard points that do not conform to the geometric elements. In one embodiment, the 3D stereoscopic image is passed through point processing filters to remove outliers and then adjusted for proper point density to remove redundant points. The geometric elements ensure that the points in the 3D stereoscopic image are matched only to actual features in the object and not to the shapes (which may be inaccurate) that the point cloud in the 3D image suggest.

The 3D stereoscopic image processing system also automatically corrects any inaccuracies inherent in the object 104 (e.g., due to distortions in sheet metal parts) using the 2D and 3D images (block 220). In one embodiment, the image processor 122 compares the original 3D stereoscopic image points it has fitted into the 2D geometric elements and determines the amount of distortion based on the difference between the actual surface location as reflected by the points in the 3D stereoscopic image and the nominal geometrical surface using the geometric characteristics for the given surface. For example, the processor 122 may calculate the flatness of a planar surface, the cylindricity of a cylindrical surface, etc, and compare the actual object geometries as represented by the point cloud with the ideal geometric characteristics of the elements forming the object. Based on the differences between the measured profile and its corresponding geometric elements, the processor 122 calculates a distortion profile and a correction matrix.

Based on this surface distortion information and the correction matrix parameters, the image processor 122 corrects the captured 2D gray-tone image and 3D stereoscopic image data to create a distortion-free model and precise coordinates for all the features in the modeled object (block 222). For example, a distorted hole on a distorted plane surface will be transformed by the correction matrix so that the true hole lies on the proper location on the undistorted surface. The circularity error of the distorted hole and the straightness error of the distorted plane in the scanned geometry are the parameters that give the correction matrix for this feature combination.

The correction matrix calculates point to point how each scanned point in the distorted geometry has to be corrected to bring it to the true shape. Other correction parameter combinations are obtained from the allowable geometry combinations for all the geometries present in the library. The processor 122 then merges all the 3D stereoscopic image surface information and all of the geometry elements to form a completed, precise 3D model (block 224).

By starting with a 2D geometric element framework to construct a 3D model, the inventive method and system not only generates a precise 3D model of a given object, but can actually compensate for distortions and imperfections in the original object by fitting the detected 3D stereoscopic image with the geometric elements forming the object. Further, treating the object as a combination of geometric elements rather than as a sculpted parametric surface also compensates for distortions and imperfections while at the same time reducing the processing resources used to generate the image. As a result, the invention creates a more precise 3D CAD model, in less time, than currently known methods.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A modeling system for modeling an object, comprising:
   at least one camera;
   an image grabber that captures a two dimensional (2D) image of the object;
   a scanner that scans the object to create a three dimensional (3D) image of the object; and
   at least one image processor that breaks the 2D image into geometric elements and matches the scanned 3D image with the geometric elements to generate the model.

2. The modeling system of claim 1, wherein the 2D image is a 2D gray-tone image and the 3D image is a 3D stereoscopic image.

3. The modeling system of claim 1, wherein said at least one camera comprises two cameras in a spaced spatial relationship.

4. The modeling system of claim 1, wherein said at least one image processor comprises a first image processor that breaks the 2D image into the geometric elements and a second image processor that matches the 3D image with the geometric elements.

5. The modeling system of claim 1, further comprising a memory accessible by said at least one processor, wherein the memory stores a geometric element standards library reflecting geometric element characteristics and wherein said at least one image processor validates the geometric elements by referencing the library.

6. The modeling system of claim 1, wherein said at least one image processor further generates a correction matrix reflecting distortion between the 3D image and the geometric elements, wherein said at least one image processor corrects the 3D image based on the correction matrix.

7. The modeling system of claim 1, wherein the scanner is a laser projector that projects a plurality of illuminated stripes on the object.

8. The modeling system of claim 1, further comprising at least one movable platform supporting at least one of said at least one camera and the object to move said at least one camera and the object relative to each other.

9. A method of generating a model of an object, comprising:
   capturing a two dimensional (2D) image of the object;

scanning the object to create a three dimensional (3D) image of the object;
breaking the 2D image into geometric elements; and
matching the 3D image with the geometric elements to generate the model.

10. The method of claim 9, further comprising validating the geometric elements with a geometric element standards library reflecting geometric element characteristics, wherein the validating step is conducted before the matching step.

11. The method of claim 9, further comprising:
determining a difference between the 3D image and the geometric elements;
generating a correction matrix based on the difference to reflect any distortion between the 3D image and the geometric elements; and
correcting the 3D image based on the correction matrix.

12. The method of claim 9, wherein the scanning step comprises projecting a plurality of illuminated stripes on the object and capturing at least one image of portions of the object illuminated by the stripes.

13. The method of claim 12, wherein the projecting step projects the illuminated stripes at a first set of locations, and wherein the scanning step further comprises projecting the plurality of illuminated stripes on the object at a second set of locations different than the first set of locations and capturing at least one image of portions of the object illuminated by the stripes in the second set of locations.

14. The method of claim 9, wherein the 3D image comprises at least one point cloud, and wherein the matching step comprises:
segmenting said at least one point cloud into a plurality of point cloud segments; and
matching each of the plurality of point cloud segments with one of the geometric elements,
and wherein the method further comprises merging the plurality of point cloud segments to generate the model.

15. The method of claim 9, further comprising controlling a scanning speed based on information from the breaking step.

16. The method of claim 9, wherein the 3D image comprises at least one point cloud, and wherein the matching step further comprises at least one of removing outliers and reducing point density in said at least one point cloud.

* * * * *